(12) United States Patent
Zhu

(10) Patent No.: US 12,288,204 B2
(45) Date of Patent: Apr. 29, 2025

(54) WALLET SYSTEM AND TRANSACTION METHOD

(71) Applicant: FIFTH FORCE TECHNOLOGY LIMITED, Hong Kong (HK)

(72) Inventor: Weisha Zhu, Beijing (CN)

(73) Assignee: FIFTH FORCE TECHNOLOGY LIMITED, Hong Kong (HK)

( * ) Notice: Subject to any disclaimer, the term of this patent is extended or adjusted under 35 U.S.C. 154(b) by 214 days.

(21) Appl. No.: 18/128,700

(22) Filed: Mar. 30, 2023

(65) Prior Publication Data
US 2023/0410092 A1   Dec. 21, 2023

Related U.S. Application Data

(63) Continuation-in-part of application No. PCT/CN2022/127487, filed on Oct. 25, 2022.

(30) Foreign Application Priority Data

May 19, 2022  (CN) .......................... 202210541275.0

(51) Int. Cl.
*G06Q 20/38* (2012.01)
*G06Q 20/36* (2012.01)

(52) U.S. Cl.
CPC ..... *G06Q 20/3672* (2013.01); *G06Q 20/3825* (2013.01); *G06Q 20/3829* (2013.01); *G06Q 20/389* (2013.01)

(58) Field of Classification Search
CPC ........... G06Q 20/3672; G06Q 20/3825; G06Q 20/3829; G06Q 20/389; G06Q 20/367; G06Q 20/3678; G06Q 20/3674; H04L 9/08; H04L 63/062
See application file for complete search history.

(56) References Cited

U.S. PATENT DOCUMENTS

2021/0357915 A1* 11/2021 Makrides ............. G06Q 20/384

FOREIGN PATENT DOCUMENTS

| CN | 111325546 A | * | 6/2020 |
| CN | 113888148 A | * | 1/2022 |
| JP | 2005203882 A | * | 7/2005 |

OTHER PUBLICATIONS

"Research on a New Signature Scheme on Blockchain", Chao Yuan, Security and Communication Networks, vol. 2017, Article ID 4746586 (Year: 2017).*

* cited by examiner

*Primary Examiner* — Duan Zhang

(57) ABSTRACT

Disclosed are a wallet system and a transaction method. The wallet system includes a communication node, a scheduling node, and at least one backup node, where each node stores one private key, and all the private keys are for a same account. First, the communication node generates a transaction request based on received payment transaction information and sends the transaction request to the scheduling node. Next, the scheduling node selects a plurality of nodes as signature nodes in response to the transaction request, and after scheduling private keys of the signature nodes to sign a payment transaction one by one, the scheduling node generates signature success information and feeds the signature success information back to the communication node. Finally, the communication node performs a payment transaction operation after receiving the signature success information.

9 Claims, 2 Drawing Sheets

WALLET SYSTEM AND TRANSACTION METHOD

CROSS REFERENCE TO RELATED APPLICATIONS

The present application is a Continuation-In-Part Application of PCT Application No. PCT/CN2022/127487 filed on Oct. 25, 2022, which claims the benefit of Chinese Patent Application No. 202210541275.0 filed on May 19, 2022. All the above are hereby incorporated by reference in their entirety.

TECHNICAL FIELD

The present disclosure relates to the field of digital asset trading, and in particular, to a wallet system and a transaction method.

BACKGROUND

Web3 is a set of extensive campaigns and protocols initiated to make the Internet more decentralized, verifiable, and secure, in other words, is the Internet that enables users to master their own data. However, in the field of digital asset trading, there is still no wallet system in the prior art to well adapt to Web3. Therefore, how to provide a wallet system adapting to Web3 is a difficult problem to be resolved in the field of digital asset trading.

SUMMARY

The present disclosure provides a wallet system and a transaction method to resolve a problem of lack of a transaction mode adapting to Web3 in the prior art. A wallet system can be built by combining a cluster technology and a multi-signature technology to realize the transaction mode adapting to Web3.

To achieve the above objective, embodiments of the present disclosure provide a wallet system, including a communication node, a scheduling node, and at least one backup node, where each node stores one private key, and all the private keys are for a same account;
  the communication node is configured to generate a transaction request based on received payment transaction information and send the transaction request to the scheduling node;
  the scheduling node is configured to select a plurality of nodes as signature nodes in response to the transaction request;
  the scheduling node is further configured to: after scheduling private keys of the signature nodes to sign a payment transaction one by one, generate signature success information and feed the signature success information back to the communication node;
  the communication node is further configured to perform a payment transaction operation after receiving the signature success information.

As an improvement of the above solution, the payment transaction information at least includes a target transaction amount, and the transaction request at least includes a target signature mode; and
  that the communication node is configured to generate the transaction request based on the received payment transaction information specifically includes:
  the communication node is configured to obtain the target signature mode based on a preset mapping relationship between a transaction amount and a signature mode and the target transaction amount.

As an improvement to the above solution, the mapping relationship is specifically as follows:
  a plurality of transaction amount grades are obtained through division based on an amount size;
  when a first transaction amount is greater than a second transaction amount, a grade of the first transaction amount is higher than or equal to a grade of the second transaction amount; and
  a higher grade leads to more signatures required in the signature mode.

As an improvement to the above solution, the private key is generated in a following manner: generating, by each node, one private key for the same account in an offline state.

As an improvement to the above solution, the communication node is further configured to: when the payment transaction information belongs to non-fungible token (NFT) transaction information, generate a transaction record based on the payment transaction operation after completing the payment transaction operation, and update its own account book; and
  the communication node is further configured to send the transaction record to other nodes, such that the other nodes update their own account books based on the transaction record.

As an improvement to the above solution, after the communication node sends the transaction request to the scheduling node, and before the scheduling node schedules the private keys of the signature nodes to sign the payment transaction one by one, the scheduling node is further configured to send its own to-be-backed up account book to all backup nodes when the transaction payment information belongs to NFT transaction information, such that the backup nodes reconcile their account books with the to-be-backed up account book and update their own account books, where the to-be-backed up account book represents information not synchronized to all other nodes in an account book of the scheduling node.

As an improvement to the above solution, the communication node is further configured to: when the payment transaction information belongs to cryptocurrency transaction information, generate a transaction record based on the payment transaction operation after completing the payment transaction operation, so as to update a public account.

As an improvement to the above solution, the system further includes a replacement node;
  the replacement node is configured to obtain a private-key encryption file of a designated to-be-replaced node from a cloud end in response to a node replacement instruction entered by a user, generate a node replacement request, and send the node replacement request to the scheduling node;
  the scheduling node is further configured to schedule, in response to the node replacement request, private keys of a plurality of other nodes than the to-be-replaced node to sign the private-key encryption file, such that the replacement node opens the private-key encryption file to obtain a private key of the to-be-replaced node, where the private-key encryption file of the to-be-replaced node is generated by encrypting the private key of the to-be-replaced node by using the private keys of the other nodes; and
  the replacement node is further configured to: after setting the private key of the to-be-replaced node as a private key of the replacement node, generate node change information and send the node change information to the scheduling node, such that the scheduling node is capable of performing node scheduling accurately.

As an improvement to the above solution, the system further includes an inheritance node, where a quantity of inheritance nodes is equal to a quantity of abandoned nodes, and the abandoned nodes include an abandoned communication node, an abandoned scheduling node, and an abandoned backup node; and a target inheritance node is configured to establish a corresponding relationship between the target inheritance node and an inheritance file stored at the cloud end based on a username and a password of one of the abandoned nodes in response to a user login instruction, where the target inheritance node is any one of the inheritance nodes; where the target inheritance node is further configured to control the cloud end to send the inheritance file to a preset social account of the user in response to a user inheritance instruction, such that the user assigns, based on the inheritance file, a username, a password, and a private key that are corresponding to an abandoned node to each of the inheritance nodes, where the inheritance file records usernames, passwords, and private keys of all the abandoned nodes.

To achieve the above objective, the embodiments of the present disclosure further provide a transaction method based on the wallet system according to any one of the above embodiments, including:

generating, by the communication node, a transaction request based on received payment transaction information, and sending the transaction request to the scheduling node;

selecting, by the scheduling node, a plurality of nodes as signature nodes in response to the transaction request;

generating, by the scheduling node after scheduling private keys of the signature nodes to sign a payment transaction one by one, signature success information, and feeding the signature success information back to the communication node; and performing, by the communication node, a payment transaction operation after receiving the signature success information.

Compared with the prior art, a wallet system and a transaction method provided in the embodiments of the present disclosure are as follows: The wallet system includes a communication node, a scheduling node, and at least one backup node, where each node stores one private key, and all the private keys are for a same account. First, the communication node generates a transaction request based on received payment transaction information and sends the transaction request to the scheduling node. Next, the scheduling node selects a plurality of nodes as signature nodes in response to the transaction request, and after scheduling private keys of the signature nodes to sign a payment transaction one by one, the scheduling node generates signature success information and feed the signature success information back to the communication node. Finally, the communication node performs a payment transaction operation after receiving the signature success information. The embodiments of the present disclosure can combine a cluster technology and a multi-signature technology to build a wallet system completely controlled by a user, so as to realize a transaction adapting to Web3.

DETAILED DESCRIPTION

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
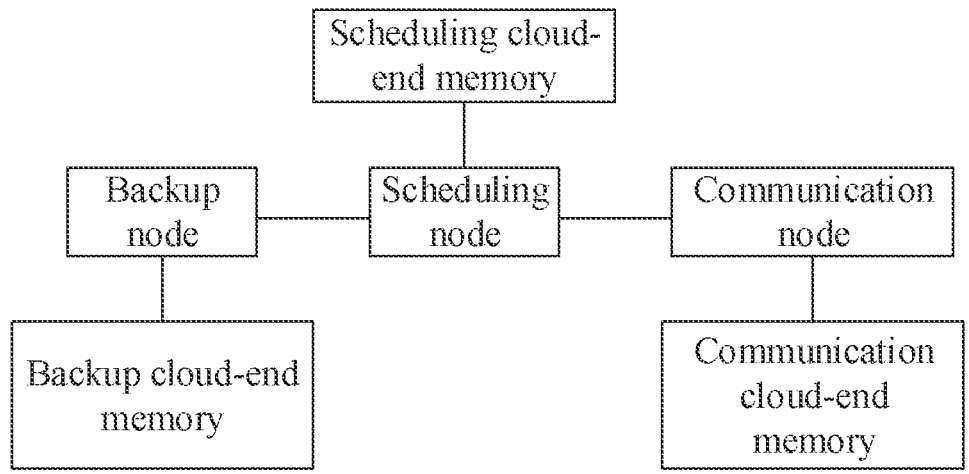
FIG. 1 is a schematic structural diagram of a wallet system according to an embodiment of the present disclosure.

FIG. 1 is a schematic structural diagram of a wallet system according to an embodiment of the present disclosure. The wall system includes a communication node, a scheduling node, and at least one backup node, where each node stores one private key, and all the private keys are for a same account;

the communication node is configured to generate a transaction request based on received payment transaction information and send the transaction request to the scheduling node;

the scheduling node is configured to select a plurality of nodes as signature nodes in response to the transaction request;

the scheduling node is further configured to: after scheduling private keys of the signature nodes to sign a payment transaction one by one, generate signature success information and feed the signature success information back to the communication node; and the communication node is further configured to perform a payment transaction operation after receiving the signature success information.

It is worth noting that each node (the communication node, the scheduling node, and the backup node) may be a mobile phone, a computer, a server, or another electronic device, which is not limited herein. A small cluster system suitable for a wallet is provided by using a GreatFree distributed language. The system is completely controlled by a user, without being controlled by an external device or external personnel. The system is a master-slave system built on a peer-to-peer network, and a role of a node can be converted based on an actual need. Each node has a function of making a private key signature. The communication node is responsible for external communication and serves as a bridge for information interaction between a device inside the system and a device outside the system. The scheduling node acts as an internal scheduling role of the system and performs information interaction with another node. The system has a function of making a multi-signature through cluster scheduling. It can be understood that in order to further improve security of the payment transaction, a verification function such as face recognition, password recognition or fingerprint recognition can be set on an electronic device where the node is located, and signature making, payment transaction, and other operations can be performed only after the verification is successful. For example, a verification operation is triggered after the scheduling node selects the signature node or after the communication node receives the signature success information. A verification mode and timing may be set by the user based on an actual need, and are not limited herein.

Specifically, the wallet system is composed of the communication node, the scheduling node, and the backup node. A quantity of backup nodes is determined by a specific application of the system. Each node stores the one private key. These private keys are for the same account, that is, each account needs to be managed by one cluster system. When it is necessary to perform a transfer operation to another account, in other words, after receiving payment transaction information, the communication node responsible for external communication processes the payment transaction information to generate a transaction request, and sends the transaction request to the scheduling node inside the system. In response to the received transaction request, the scheduling node selects a plurality of nodes from all the nodes in the system as signature nodes, where a quantity of signature nodes is determined by a preset signature quantity rule, and the signature node may be the scheduling node, the communication node, or the backup node. The signature node is selected according to a preset selection rule, and may be selected randomly or by presetting a priority, which is not limited herein. The scheduling node schedules the signature node, such that the signature node uses its own private key to sign the current payment transaction, generates signature success information, and feeds the signature success information back to the communication node, such that the communication node obtains a transaction signal, so as to perform a payment transaction operation.

Compared with the prior art, a wallet system provided in this embodiment of the present disclosure is as follows: The wallet system includes a communication node, a scheduling node, and at least one backup node, where each node stores one private key, and all the private keys are for a same account. First, the communication node generates a transaction request based on received payment transaction information and sends the transaction request to the scheduling node. Next, the scheduling node selects a plurality of nodes as signature nodes in response to the transaction request, and after scheduling private keys of the signature nodes to sign a payment transaction one by one, the scheduling node generates signature success information and feeds the signature success information back to the communication node. Finally, the communication node performs a payment transaction operation after receiving the signature success information. This embodiment of the present disclosure can combine a cluster technology and a multi-signature technology to build a wallet system completely controlled by a user, so as to realize a transaction adapting to Web3.

In an implementation, the payment transaction information at least includes a target transaction amount, and the transaction request at least includes a target signature mode; and that the communication node is configured to generate the transaction request based on the received payment transaction information specifically includes:

the communication node is configured to obtain the target signature mode based on a preset mapping relationship between a transaction amount and a signature mode and the target transaction amount.

Specifically, the payment transaction information received by the communication node inevitably includes the target transaction amount. In this implementation, the target signature mode is determined by the target transaction amount. The communication node queries the preset mapping relationship between the transaction amount and the signature mode, and finds a signature mode corresponding to the target transaction amount as the target signature mode. The signature mode may be determining a specific signature node or setting the quantity of signature nodes, which is not limited herein.

In an implementation, the mapping relationship is specifically as follows:
 a plurality of transaction amount grades are obtained through division based on an amount size;
 when a first transaction amount is greater than a second transaction amount, a grade of the first transaction amount is higher than or equal to a grade of the second transaction amount; and
 a higher grade leads to more signatures required in the signature mode.

Specifically, the mapping relationship between the transaction amount and the signature mode is actually a mapping relationship between the transaction amount and a quantity of signatures (the quantity of signature nodes). The mapping relationship is set by the user when the system is built, and may be modified by the user based on an actual need in a subsequent application of the system. Transaction amount grades of a preset quantity are obtained through division based on the amount size. A larger transaction amount leads to a higher grade (including a case in which different transaction amounts correspond to a same grade, which is represented in a form of a piecewise function), and a higher grade leads to more signatures required in a corresponding signature mode. Signatures of a different quantity are selected based on the transaction amount, which considers both convenience of the payment transaction and ensures security of the payment transaction.

For example, it is assumed that there are three nodes (the communication node, the scheduling node, and the backup node) in the system, each node has one private key, a multi-signature scheme is executed, and a 3-1 signature mode (only one private key is required to make a signature), a 3-2 signature mode (two private keys are required to make signatures), and a 3-3 signature mode (all private keys are required to make signatures) are preset in advance. The preset mapping relationship is specifically as follows: a transaction amount less than or equal to 3000 CNY corresponds to the 3-1 signature mode, a transaction amount greater than 3000 CNY and less than or equal to 10000 CNY corresponds to the 3-2 signature mode, and a transaction amount greater than 10000 CNY corresponds to the 3-3 signature mode.

It is worth noting that the mapping relationship is not limited to the above specific examples, but may be set based on an actual situation. It can be understood that a minimum quantity of signatures is 0, and a maximum quantity of signatures is equal to a quantity of private keys. The quantity of private keys and a specific quantity of grades are set by the user. A minimum quantity of grades is 1, and a maximum quantity of grades is related to the quantity of private keys in the system, which is the quantity of private keys plus 1.

In an implementation, the payment transaction information further includes transaction party information; and
 the performing a payment transaction operation specifically includes: sending the target transaction amount to a corresponding transaction party based on the transaction party information. Specifically, when performing the payment transaction operation, the communication node needs to determine the target transaction amount and the transaction party information (an account of the transaction party) before transferring the target transaction amount to the transaction party.

In an implementation, the private key is generated in a following manner: generating, by each node, one private key for the same account in an offline state.

Specifically, because the wallet system is a peer-to-peer network, the private keys can be generated separately in the offline state. The offline state herein is a state in which a node is disconnected from other nodes. The private key of each node is generated by the node itself, and each node only knows its own private key, and does not know private keys of other nodes. This avoids a possibility of leakage of private keys of other nodes when a node is attacked, thereby improving safety performance of the system.

In an implementation, the communication node is further configured to: when the payment transaction information belongs to NFT transaction information, generate a transaction record based on the payment transaction operation after completing the payment transaction operation, and update its own account book; and the communication node is further configured to send the transaction record to other nodes, such that the other nodes update their own account books based on the transaction record.

Specifically, after completing the payment transaction operation, the communication node needs to update an account book to which the account belongs. Different types of accounts correspond to different account book storage modes. The payment transaction information received by the communication node is payment transaction information about an NFT, which indicates that the account is an NFT account. Each node of the system has a child account book. After completing the payment transaction operation, the communication node generates the transaction record based on the payment transaction operation to update its own account book, and sends the transaction record to the other nodes (the scheduling node and the backup node), such that the other nodes update their own account books based on the transaction record, thereby realizing data synchronization and backup. It can be understood that in each payment transaction process, the communication node as a bridge to perform information interaction with the outside, and the scheduling node for signature scheduling are inevitably online. Therefore, the account book of the communication node and an account book of the scheduling node are consistent, recording all transactions. The backup node is only a provider of the private key, and does not need to be online in real time. Therefore, an account book of the backup node may not be updated in real time.

Further, each node generates asset information based on its own account book. When receiving an asset query instruction entered by the user, the node displays the asset information on a display screen for the user to consult.

Further, the scheduling node is further configured to perform information interaction with an external preset transaction system "chainless platform". The chainless platform establishes an information interaction relationship with another wallet system. In practical application, the chainless platform is configured to track a transfer operation. After detecting that a payment has been received, the chainless platform generates transaction success information and feeds the transaction success information back to two parties involved in a corresponding transaction, such that the two parties involved in the transaction know that the transaction is completed.

In an implementation, after the communication node sends the transaction request to the scheduling node, and before the scheduling node schedules the private keys of the signature nodes to sign the payment transaction one by one, the scheduling node is further configured to send its own to-be-backed up account book to all backup nodes when the transaction payment information belongs to NFT transaction information, such that the backup nodes reconcile their account books with the to-be-backed up account book and update their own account books, where the to-be-backed up account book represents information not synchronized to all other nodes in the account book of the scheduling node.

Specifically, the to-be-backed up account book is account book information that has not been completely backed up (that is, the account book is not synchronized to all the backup nodes), and the to-be-backed up account book is temporarily stored in a to-be-backed up account book cache region of the scheduling node. The nodes in a wallet system cluster are not all powered on in real time, and the information of the nodes that are not powered on is synchronized in the scheduling node. In order to improve accuracy of data backup, before sending the to-be-backed up account book to the backup node, the scheduling node needs to reconcile the to-be-backed up account book with its own account book, and then transmits the to-be-backed up account book when the to-be-backed up account book is correct. Because it cannot be ensured that the backup node is online in real time, the scheduling node needs to send the to-be-backed up account book to an online backup node for reconciliation before each transfer operation, so as to synchronize the account book of the backup node with that of the scheduling node. In a synchronization process, the reconciliation can be performed based on a time stamp of each piece of data in the account book. After receiving the transaction request, the scheduling node learns that the transaction is to be performed. In order to ensure account book synchronization before the transfer operation, the scheduling node sends its temporarily stored to-be-backed up account book to the online backup node before signature scheduling, such that the backup node performs data synchronization.

In an implementation, the communication node is further configured to: when the payment transaction information belongs to cryptocurrency transaction information, generate a transaction record based on the payment transaction operation after completing the payment transaction operation, so as to update a public account.

Specifically, if the system serves a cryptocurrency transaction, there is no account book in the system, but the transaction is recorded in a form of the public account. After completing the payment transaction operation, the communication node generates the corresponding transaction record based on the payment transaction operation, and sends the transaction record to a full node of a corresponding cryptocurrency. The full node is responsible for managing and updating the public account. It can be understood that the process ends after the transaction record is generated and sent to the public account, and the public account can be updated based on the transaction record. For the wallet system, the transaction record is sent to a temporary data pool of the full node of the cryptocurrency.

Further, as a chainless system, the wallet system stores a child account book on each node. The wallet system supports storage of sub-accounts, NFT metadata, and indexes of the chainless system, and also includes a private key of the cryptocurrency.

Figure 2:
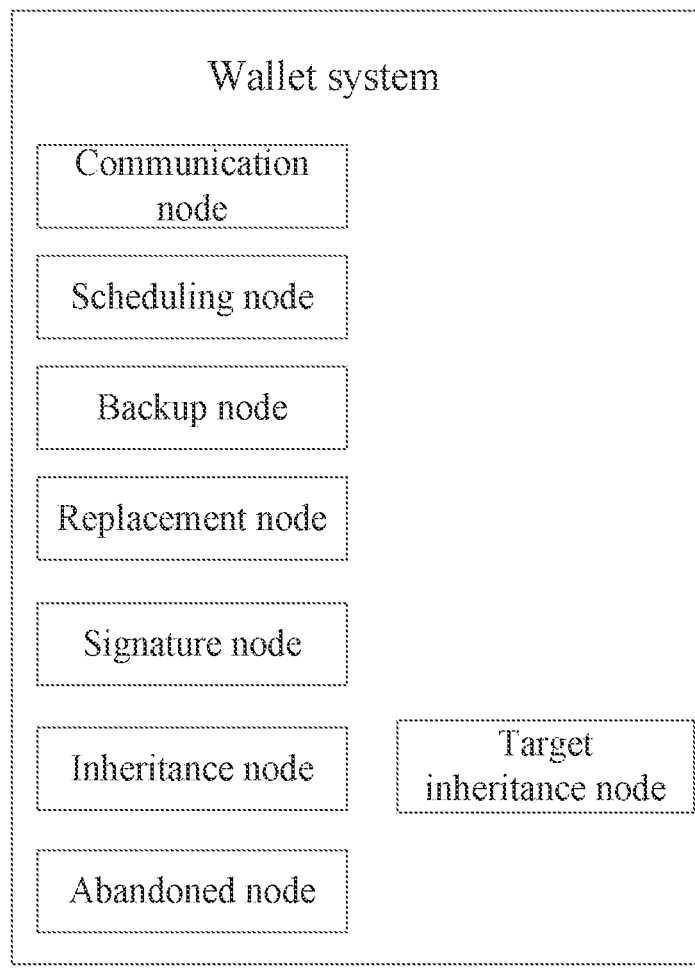
FIG. 2 is a schematic structural diagram of a wallet system according to another embodiment of the present disclosure.

Referring to FIG. 2, in an implementation, the system further includes a replacement node;

the replacement node is configured to obtain a private-key encryption file of a designated to-be-replaced node from a cloud end in response to a node replacement instruction entered by the user, generate a node replacement request, and send the node replacement request to the scheduling node;

the scheduling node is further configured to schedule, in response to the node replacement request, private keys of a plurality of other nodes than the to-be-replaced node to sign the private-key encryption file, such that the replacement node opens the private-key encryption file to obtain a private key of the to-be-replaced node, where the private-key encryption file of the to-be-replaced node is generated by encrypting the private key of the to-be-replaced node by using the private keys of the other nodes; and the replacement node is further configured to: after setting the private key of the to-be-replaced node as a private key of the replacement node, generate node change information and send the node change information to the scheduling node, such that the scheduling node is capable of performing node scheduling accurately.

Specifically, as shown in FIG. 1, in the system, each node is configured with one cloud-end memory (a backup cloud-end memory, a scheduling cloud-end memory, or a communication cloud-end memory). The cloud-end memory may be a home cloud, an InterPlanetary File System (IPFS), or another cloud storage system, which is not limited herein. After generating the private key, the node encrypts the private key to obtain the private-key encryption file (smart contract), and sends the private-key encryption file to the cloud-end memory corresponding to the node for cloud backup of the private key. For example, the private-key encryption file can be decrypted by private keys of other nodes, for example, in the 3-2 signature mode. When a device is lost, the replacement node (a new device) responds to a node replacement instruction entered by the user, accesses, by using a preset password, a cloud-end memory corresponding to the lost device, downloads a private-key encryption file from the cloud end, generates a node replacement request, and sends the node replacement request to the scheduling node. In response to the node replacement request, the scheduling node schedules private keys of other devices than the lost device to decrypt the private-key encryption file of the new device, such that the new device obtains a private key of the lost device. Then, the new device sets the obtained private key as its own private key, and generates node change information and sends the node change information to the scheduling node, such that the scheduling node can accurately schedule the new device in a subsequent transaction process.

In an implementation, when the user wants to replace an old device with a new device, the old device provides its own private key to the new device in response to a private key transfer instruction entered by the user. Specifically, the old device generates a quick response code for its own private key based on the private key in response to the private key transfer instruction entered by the user, and the new device obtains the corresponding private key by scanning the quick response code of the private key.

In an implementation, the system further includes an inheritance node, where a quantity of inheritance nodes is equal to a quantity of abandoned nodes, and the abandoned nodes include an abandoned communication node, an abandoned scheduling node, and an abandoned backup node; and a target inheritance node is configured to establish a corresponding relationship between the target inheritance node and an inheritance file stored at the cloud end based on a username and a password of one of the abandoned nodes in response to a user login instruction, where the target inheritance node is any one of the inheritance nodes; where the target inheritance node is further configured to control the cloud end to send the inheritance file to a preset social account of the user in response to a user inheritance instruction, such that the user assigns, based on the inheritance file, a username, a password, and a private key that are corresponding to an abandoned node to each of the inheritance nodes, where the inheritance file records usernames, passwords, and private keys of all the abandoned nodes.

Specifically, the private key is inherited when all the original nodes are lost. The inheritance file records a username, as well as a password and a private key that are corresponding to the username for each node in the wallet system. When all original devices (abandoned nodes) are lost, in response to a user login instruction, a new device (target inheritance node) logs in based on a username and a password of one of the abandoned nodes, and establishes a connection to a cloud-end memory corresponding to the abandoned node, in other words, establishes a corresponding relationship between the new device and the cloud-end memory stored at the cloud end, and in response to a user inheritance instruction, the new device controls, after a preset time period, the corresponding cloud-end memory to send the inheritance file to the preset social account (such as a mailbox or a mobile phone number) of the user. The preset time period may be set by the user based on an actual need. After the preset time period, a preset inheritance reminder message is displayed (through voice broadcasting or text displaying). The user can assign user names, passwords, and private keys to new devices (inheritance nodes) of a preset quantity based on the received inheritance file to replace the original devices. The quantity of the new devices is the same as that of the original devices. Further, when receiving the user inheritance instruction, the new device obtains a pre-stored inheritance verification question at the cloud end for the user to answer. When a user's answer to the inheritance verification question and a preset standard answer meet a preset accuracy rate, the new device performs a next operation.

Further, after the private key is inherited, a communication inheritance node generates a transaction request when receiving payment transaction information, and sends the transaction request to a scheduling inheritance node. The inheritance nodes include one communication inheritance node, one scheduling inheritance node, and at least one backup inheritance node.

In response to the transaction request, the scheduling inheritance node schedules private keys of all the inheritance nodes to sign a payment transaction one by one, generates signature success information, and feeds the signature success information back to the communication inheritance node.

The communication inheritance node performs a payment transaction operation after receiving the signature success information.

It can be understood that a device loss brings some insecurity. Therefore, after the private key is inherited, all private keys need to be used to make a signature for this transaction to reduce a risk. Further, if the user wants to further reduce the risk, the user can build a new wallet system, transfer all assets in the original wallet system to the new wallet system for asset management, and discard the original wallet system to improve asset security.

Further, the wallet system has a program security self-check function to ensure that a program is complete and synchronized and accounting is correct. Generally, a self-check operation is performed when an electronic device where the node is located is powered on.

Further, since an electronic device where the communication node is located also involves a third-party application, such as WeChat, Alipay, or another centralized application, the wallet system can not only directly conduct the payment transaction as an independent application, but also interface with the third-party application for third-party application payment. Therefore, it is necessary to obtain an interface standard of an application programming interface (API) of the third-party application to configure the API for the wallet system, so as to enable the wallet system to smoothly interface with a third-party system for transaction payment.

This embodiment of the present disclosure can combine a cluster technology and a multi-signature technology to build a wallet system completely controlled by the user, so as to realize a transaction adapting to Web3.

Figure 3:
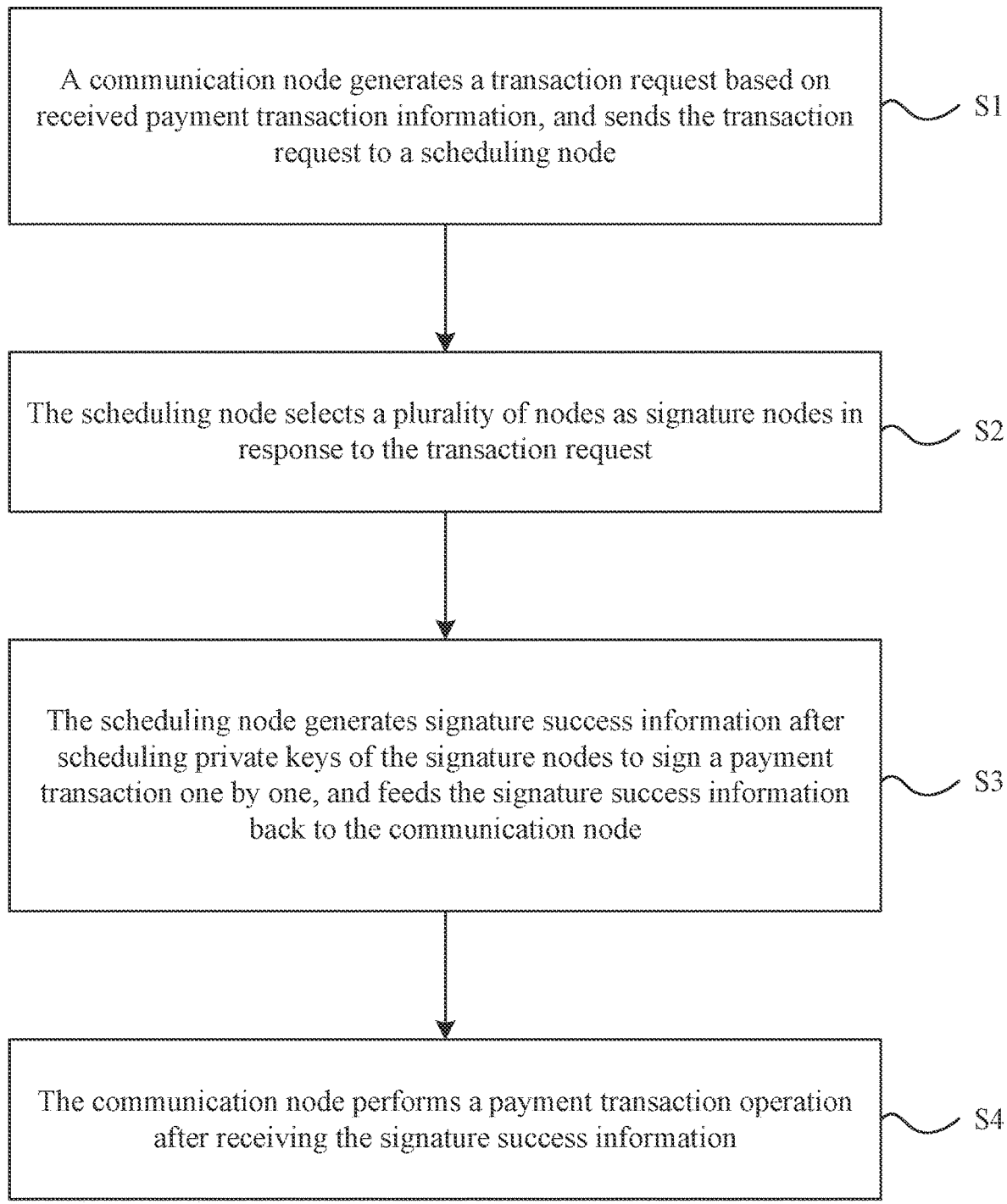
FIG. 3 is a schematic flowchart of a transaction method according to an embodiment of the present disclosure.

Referring to a schematic flowchart of a transaction method shown in FIG. 3, an embodiment of the present disclosure provides a transaction method, which is applied to the wallet system described in any one of the above embodiments, and includes following steps:

S1: A transaction request is generated by a communication node based on received payment transaction information, and sent to a scheduling node.

S2: A plurality of nodes are selected as signature nodes by the scheduling node in response to the transaction request.

S3: Signature success information is generated by the scheduling node after scheduling private keys of the signature nodes to sign a payment transaction one by one, and fed back to the communication node.

S4: A payment transaction operation is performed by the communication node after receiving the signature success information.

It is worth noting that for a specific working process of the transaction method, reference may be made to the working process of the wallet system in the above embodiments, and details are not described herein again.

Compared with the prior art, the transaction method provided in this embodiment of the present disclosure is as follows: First, the communication node generates the transaction request based on the received payment transaction information and sends the transaction request to the scheduling node. Next, the scheduling node selects the nodes as the signature nodes in response to the transaction request, and after scheduling the private keys of the signature nodes to sign the payment transaction one by one, the scheduling node generates the signature success information and feeds the signature success information back to the communication node. Finally, the communication node performs the payment transaction operation after receiving the signature success information. This embodiment of the present disclosure can combine a cluster technology and a multi-signature technology to build a wallet system completely controlled by a user, so as to realize a transaction adapting to Web3.

The invention claimed is:

1. A wallet system, comprising a communication node, a scheduling node, and at least one backup node, wherein each node stores one private key, and all the private keys are for a same account;

the communication node is configured to generate a transaction request based on received payment transaction information and send the transaction request to the scheduling node;

the scheduling node is configured to select a plurality of nodes as signature nodes in response to the transaction request;

the scheduling node is further configured to: after scheduling private keys of the signature nodes to sign a payment transaction one by one, generate signature success information and feed the signature success information back to the communication node;

the communication node is further configured to perform a payment transaction operation after receiving the signature success information;

the system further comprises a replacement node;

the replacement node is configured to obtain a private-key encryption file of a designated to-be-replaced node from a cloud end in response to a node replacement instruction entered by a user, generate a node replacement request, and send the node replacement request to the scheduling node;

the scheduling node is further configured to schedule, in response to the node replacement request, private keys of a plurality of other nodes than the to-be-replaced node to sign the private-key encryption file, such that the replacement node opens the private-key encryption file to obtain a private key of the to-be-replaced node, wherein the private-key encryption file of the to-be-replaced node is generated by encrypting the private key of the to-be-replaced node by using the private keys of the other nodes; and the replacement node is further configured to: after setting the private key of the to-be-replaced node as a private key of the replacement node, generate node change information and send the node change information to the scheduling node, such that the scheduling node is capable of performing node scheduling accurately.

2. The wallet system according to claim 1, wherein the payment transaction information at least comprises a target transaction amount, and the transaction request at least comprises a target signature mode; and that the communication node is configured to generate the transaction request based on the received payment transaction information specifically comprises:

the communication node is configured to obtain the target signature mode based on a preset mapping relationship between a transaction amount and a signature mode and the target transaction amount.

3. The wallet system according to claim 2, wherein the mapping relationship is specifically as follows:

a plurality of transaction amount grades are obtained through division based on an amount size;

when a first transaction amount is greater than a second transaction amount, a grade of the first transaction amount is higher than or equal to a grade of the second transaction amount; and a higher grade leads to more signatures required in the signature mode.

4. The wallet system according to claim 1, wherein the private key is generated in a following manner: generating, by each node, one private key for the same account in an offline state.

5. The wallet system according to claim 1, wherein the communication node is further configured to: when the payment transaction information belongs to non-fungible token (NFT) transaction information, generate a transaction record based on the payment transaction operation after completing the payment transaction operation, and update its own account book; and the communication node is further configured to send the transaction record to other nodes, such that the other nodes update their own account books based on the transaction record.

6. The wallet system according to claim 1, wherein after the communication node sends the transaction request to the scheduling node, and before the scheduling node schedules the private keys of the signature nodes to sign the payment transaction one by one, the scheduling node is further configured to send its own to-be-backed up account book to all backup nodes when the transaction payment information belongs to NFT transaction information, such that the backup nodes reconcile their account books with the to-be-backed up account book and update their own account books, wherein the to-be-backed up account book represents information not synchronized to all other nodes in an account book of the scheduling node.

7. The wallet system according to claim 1, wherein the communication node is further configured to: when the payment transaction information belongs to cryptocurrency transaction information, generate a transaction record based on the payment transaction operation after completing the payment transaction operation, so as to update a public account.

8. The wallet system according to claim 1, wherein the system further comprises an inheritance node, wherein a quantity of inheritance nodes is equal to a quantity of abandoned nodes, and the abandoned nodes comprise an abandoned communication node, an abandoned scheduling node, and an abandoned backup node; and a target inheritance node is configured to establish a corresponding relationship between the target inheritance node and an inheritance file stored at the cloud end based on a username and a password of one of the abandoned nodes in response to a user login instruction, wherein the target inheritance node is any one of the inheritance nodes; wherein the target inheritance node is further configured to control the cloud end to send the inheritance file to a preset social account of the user in response to a user inheritance instruction, such that the user assigns, based on the inheritance file, a username, a password, and a private key that are corresponding to an abandoned node to each of the inheritance nodes, wherein the inheritance file records usernames, passwords, and private keys of all the abandoned nodes.

9. A transaction method comprising:

generating, by the communication node, a transaction request based on received payment transaction information, and sending the transaction request to the scheduling node;

selecting, by the scheduling node, a plurality of nodes as signature nodes in response to the transaction request;

generating, by the scheduling node after scheduling private keys of the signature nodes to sign a payment transaction one by one, signature success information, and feeding the signature success information back to the communication node;

performing, by the communication node, a payment transaction operation after receiving the signature success information;

obtaining, by the replacement node, a private-key encryption file of a designated to-be-replaced node from a cloud end in response to a node replacement instruction entered by a user, generating a node replacement request, and sending the node replacement request to the scheduling node;

scheduling, by the scheduling node in response to the node replacement request, private keys of a plurality of other nodes than the to-be-replaced node to sign the private-key encryption file, such that the replacement node opens the private-key encryption file to obtain a private key of the to-be-replaced node, wherein the private-key encryption file of the to-be-replaced node is generated by encrypting the private key of the to-be-replaced node by using the private keys of the other nodes; and generating, by the replacement node after setting the private key of the to-be-replaced node as a private key of the replacement node, node change information, and sending the node change information to the scheduling node, such that the scheduling node is capable of performing node scheduling accurately.

* * * * *